(12) United States Patent
Assarpour et al.

(10) Patent No.: US 9,923,815 B2
(45) Date of Patent: Mar. 20, 2018

(54) NETWORK BASED SERVICE FUNCTION CHAINING ON TOP OF RACK SWITCHES

(71) Applicant: AVAGO TECHNOLOGIES GENERAL IP (SINGAPORE) PTE. LTD., Singapore (SG)

(72) Inventors: Hamid Assarpour, Arlington, MA (US); Nicholas Ilyadis, Merrimack, NH (US); Ariel Hendel, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 80 days.

(21) Appl. No.: 14/861,163

(22) Filed: Sep. 22, 2015

(65) Prior Publication Data

US 2016/0134531 A1 May 12, 2016

Related U.S. Application Data

(60) Provisional application No. 62/162,070, filed on May 15, 2015, provisional application No. 62/078,196, filed on Nov. 11, 2014.

(51) Int. Cl.
| | |
|---|---|
| *H04L 29/06* | (2006.01) |
| *H04L 12/741* | (2013.01) |
| *H04L 12/721* | (2013.01) |
| *H04L 12/935* | (2013.01) |
| *H04L 12/725* | (2013.01) |
| *H04L 12/851* | (2013.01) |

(Continued)

(52) U.S. Cl.
CPC .......... *H04L 45/74* (2013.01); *H04L 29/0653* (2013.01); *H04L 41/5041* (2013.01); *H04L 45/306* (2013.01); *H04L 45/38* (2013.01); *H04L 47/2441* (2013.01); *H04L 49/00* (2013.01); *H04L 49/309* (2013.01)

(58) Field of Classification Search
CPC . H04L 49/90; H04L 12/2834; H04L 12/2856; H04L 29/06401; H04L 41/50; H04L 41/5045; H04L 12/54; H04L 29/0653; H04L 49/309; H04W 88/18
See application file for complete search history.

(56) References Cited

U.S. PATENT DOCUMENTS

| | | | |
|---|---|---|---|
| 2015/0071285 A1* | 3/2015 | Kumar | H04L 45/306 370/392 |
| 2015/0134777 A1* | 5/2015 | Onoue | H04L 63/0281 709/217 |

(Continued)

OTHER PUBLICATIONS

Zhang et al. "Service Chain Header", Mar. 24, 2014.*

(Continued)

*Primary Examiner* — Salvador E Rivas
(74) *Attorney, Agent, or Firm* — Oblon, McClelland, Maier & Neustadt, L.L.P.

(57) ABSTRACT

Service aware network devices coordinate function chains of virtual functions. The network devices are aware of which virtual functions exist and how to interconnect them in the most efficient manner and define and process service graphs that can be maintained, monitored and redirected. The network devices themselves implement and manage the service graphs, as opposed to the virtual servers that host the virtual functions.

20 Claims, 12 Drawing Sheets

(51) Int. Cl.
*H04L 12/931* (2013.01)
*H04L 12/24* (2006.01)

(56) References Cited

U.S. PATENT DOCUMENTS

| 2015/0195197 A1* | 7/2015 | Yong | H04L 45/74 |
| | | | 370/392 |
| 2015/0263901 A1* | 9/2015 | Kumar | H04L 41/12 |
| | | | 370/254 |
| 2016/0065456 A1* | 3/2016 | Muley | H04L 45/38 |
| | | | 370/392 |

OTHER PUBLICATIONS

John, Wolfgang, et al., Research Directions in Network Service Chaining, Future Networks and Services (SDN4FNS), Nov. 11-13, 2013, pp. 1-9, Institute of Electrical and Electronics Engineers, New York, New York.

* cited by examiner

NETWORK BASED SERVICE FUNCTION CHAINING ON TOP OF RACK SWITCHES

PRIORITY CLAIM

This application claims priority to provisional application Ser. No. 62/162,070, filed 15 May 2015, and provisional application Ser. No. 62/078,196 filed 11 Nov. 2014; both are entirely incorporated by reference.

TECHNICAL FIELD

This disclosure relates to network function virtualization.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high speed data networks have emerged and matured, and now form part of the backbone of what has become indispensable worldwide data connectivity, including connectivity to virtual machine hosts. Improvements in virtualization will drive the further development and deployment of virtualization functionality.

DETAILED DESCRIPTION

Introduction

Figure 1:
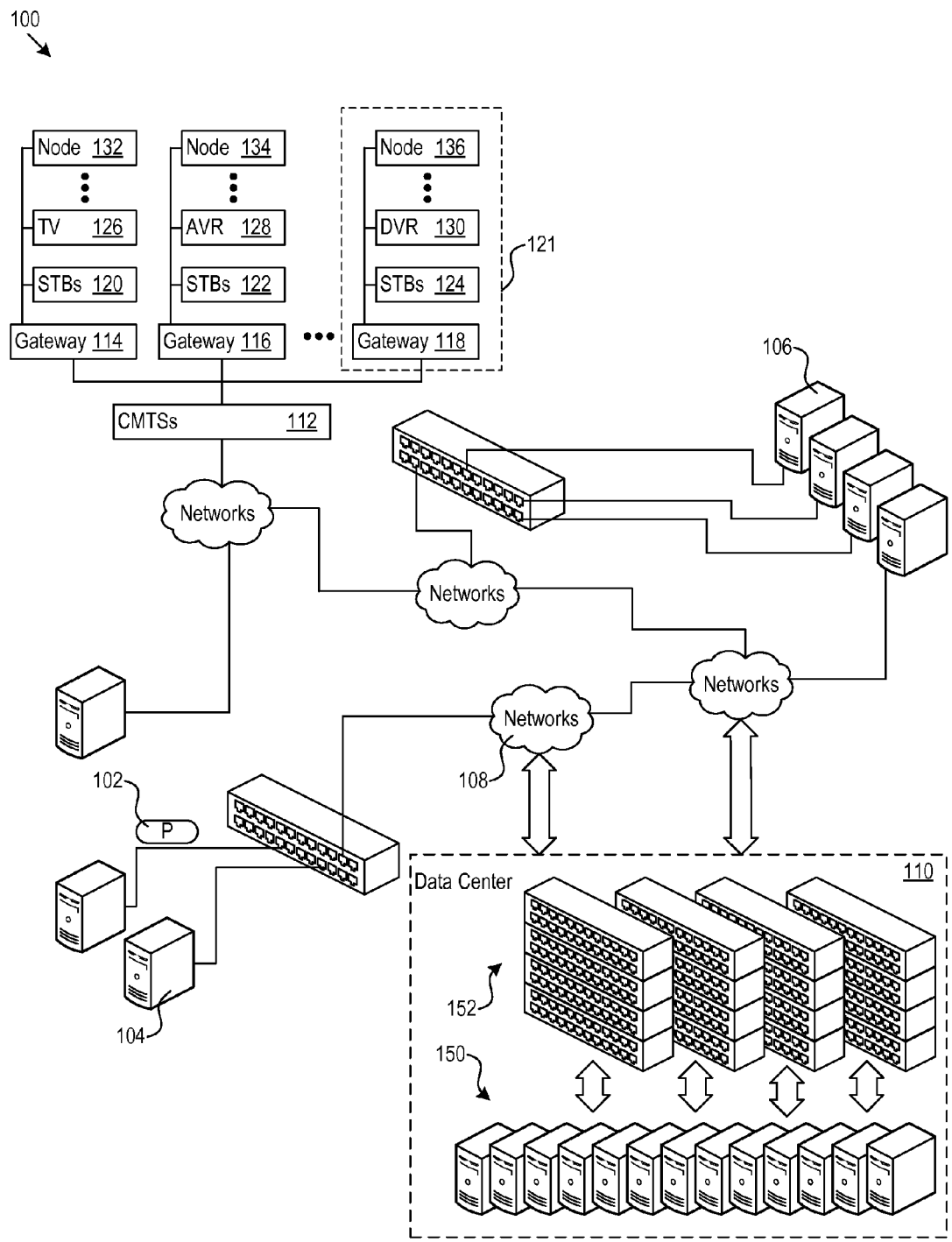
FIG. 1 shows an example of a network that includes virtual machine hosts connected by network devices.
Figure 2:
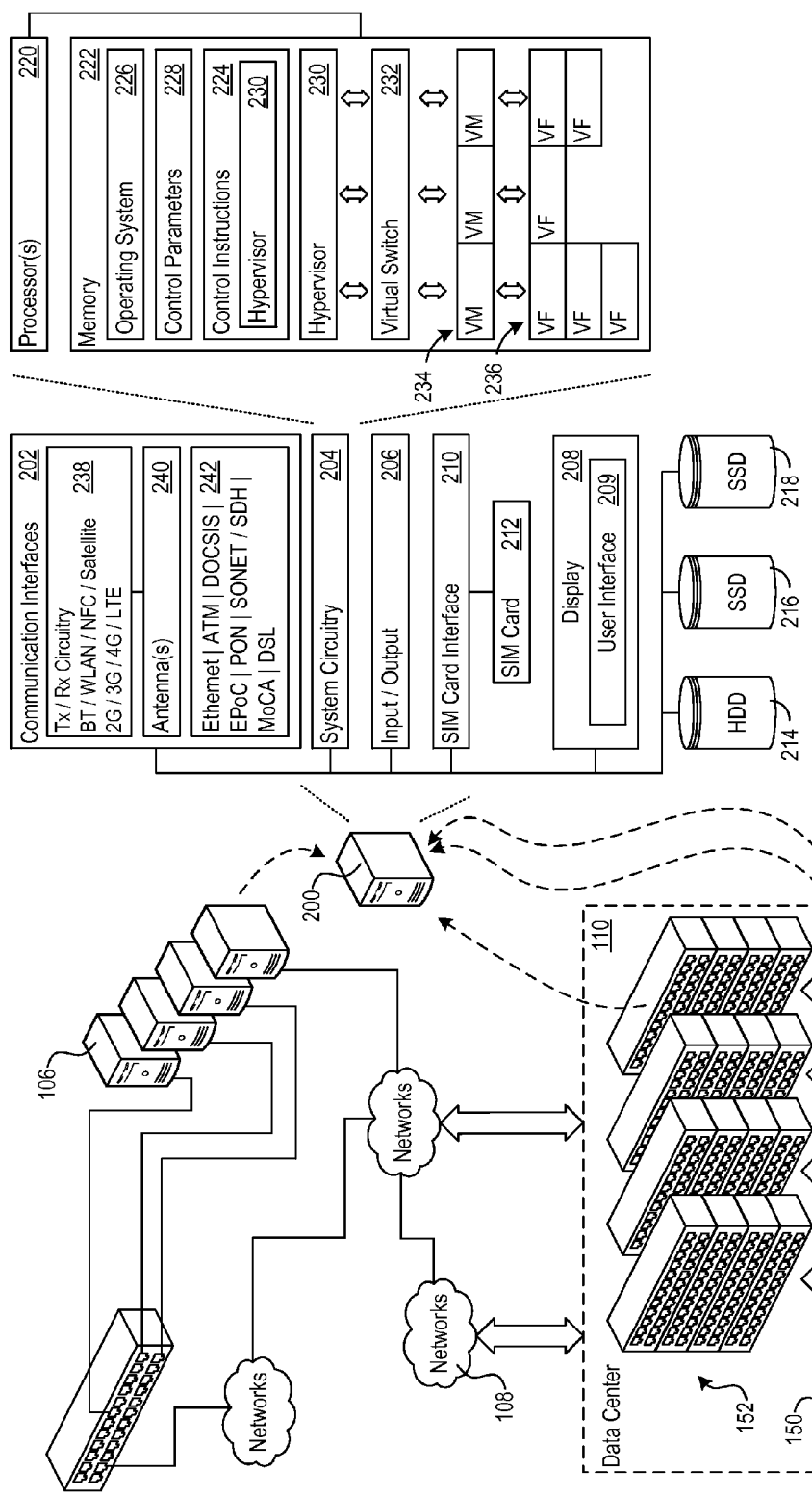
FIG. 2 shows a virtual machine host configured to execute virtual machines and virtual functions.

FIGS. 1 and 2 provide a context for the further discussion of the network based service function chaining, which is described below in more detail starting with FIG. 3. Some of the SFC acronyms used below are summarized in Table 1:

TABLE 1

| Acronym | Expansion |
|---------|-----------|
| SFC | service function chaining |
| SC | service function chain |
| SCID | service chain identifier |
| SF | service function |
| SFI | service function index |
| SCC | service chain classifier |
| SFF | service function forwarder |
| VS | virtual switch |
| VM | virtual machine |
| STEP | service tunnel endpoint |
| XTEP | data center endpoint |
| ToR | top of rack |

FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 121, such as homes, offices, schools, and government buildings. The network 100 may include other types of termination systems and gateways. For example, the network 100 may include digital subscriber line (DSL) termination systems and DSL modems that function as the entry points into homes, offices, or other locations.

At any given location, the gateway may connect to any number and any type of node. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players 132, gaming systems 134, computer systems 136, and physical media (e.g., BluRay) players. The nodes may represent any type of customer premises equipment (CPE).

FIG. 2 shows a virtual machine host 200 ("host") configured to execute virtual switches, virtual machines, and virtual functions. Any of the devices in the network 100 may be hosts, including the nodes, gateways, CMTSs, switches, servers, sources, and destinations. The hosts provide an environment in which any selected functionality may run, may be reachable through the network 100, and may form all or part of a chain of functionality to accomplish any defined processing or content delivery task. The functionality may be virtual in the sense that, for example, the virtual functions implement, as software instances running on the hosts, functions that were in the past executed with dedicated hardware.

In FIG. 2, the host 200 includes one or more communication interfaces 202, system circuitry 204, input/output interfaces 206, and a display 208 on which the host 200 generates a user interface 209. The communication interfaces 202 may include transmitter and receivers ("transceivers") 238 and any antennas 240 used by the transceivers 238. The transceivers 238 may provide physical layer interfaces for any of a wide range of communication protocols 242, such as any type of Ethernet, data over cable service interface specification (DOCSIS), digital subscriber line (DSL), multimedia over coax alliance (MoCA), or other protocol. When the communication interfaces 202 support cellular connectivity, the host 200 may also include a SIM card interface 210 and SIM card 212. The host 200 also includes storage devices, such as hard disk drives 214 (HDDs) and solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, switches, and functions, routing packets between the virtual machines and the network 100, and switching packets between the virtual machines.

As just one example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out any desired functionality for the host 200. The control parameters 228 provide and specify configuration and operating options for the control instructions 224, operating system 226, and other functionality of the host 200.

In some implementations, the control instructions 224 include a hypervisor 230. The hypervisor 230 provides a supervising software environment that executes one or more virtual machines (VMs), virtual switches (VSs) 232, virtual firewalls, virtual operating systems, virtual network interface cards (NICs), or any other desired virtualization components. In other implementations, the host 200 is a bare-metal virtualization host. That is, the host 200 need not execute a separate operating system 226 on top of which the hypervisor 230 runs. Instead, the hypervisor 230 may directly communicate with and control the physical hardware resources in the host 200 without supervision or intervention through a separate operating system.

The host 200 may execute any number of VMs 234. Each VM may execute any number or type of virtual functions (VFs) 236. The VFs may be software implementations of any desired functionality, ranging, for instance, from highly specialized network functions to general purpose processing functions.

As just a few examples of service functions, the VFs 236 may implement network firewalls, messaging spam filters, and network address translators. As other example of processing functions, the VFs 236 may implement audio and video encoders and transcoders, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs 236 include audio, video, and image compression and decompression, such as H.264, MPG, and MP4 compression and decompression; audio and video pre- and post-processing; server functionality such as video on demand servers, DVR servers; over the top (OTT) servers; secure key storage, generation, and application; and 2D and 3D graphics rendering.

Network Based Service Chaining

Network based service function chaining (SFC) involves a service aware network. In the network itself, network devices such as top of rack (ToR) switches are aware of what service functions (SFs) exist, e.g., the VFs 236, which hosts execute the service functions, the connectivity paths between hosts and the network devices, and how to interconnect the service functions in an efficient manner to form an end-to-end service chain (SC) of processing. Service functions may be virtual functions (VFs) running on a VM, may be non-virtualized functions of any kind running on a physical server outside of a virtualization environment, or may be otherwise provisioned in devices connected to the network.

The network devices (e.g., the ToR switches) monitor, create, and maintain definitions of SCs that define a sequence of service functions for any desired packet processing. The network devices determine the next hop for packets along any given SC, and track progress through the SC. One result is that the hosts 200, VFs 236, and virtual switches 234 need not maintain any service chaining forwarding state information. Instead, the hosts 200 locally process the packets according to the hosted SFs associated with any given SC, and return those packets after processing back to the network devices. The network devices make a determination of the next SF, and the location of the next SF. The network devices then forward the packets to the appropriate destination for continued processing through the SC.

The network SFC capabilities allow a network to create logical connections among and between one or more service functions in a particular order to provide a sequence of service functions that is independent of the underlying physical network topology. The architecture may implement, as part of SFC, several functional components, including a SFC Classifier (SCC) and a Service Function Forwarder (SFF). The SCC may map the subscriber or customer packets flows or sub-flows to a particular SC, e.g., responsive to a specified policy for the customer, the traffic type, quality of service level, time and date, source, or other mapping criteria.

The SFF forwards packets from one SF to the next within the context of the SC determined for the packet flow. Note that rather than implementing the SCC and SFF functions in a server node (or other end point device), the architecture described below may implement these functions in the network devices themselves. In other implementations, SFC classification information is determined by nodes other than the network devices that perform SFC, and those nodes provide the classification information to the network devices which perform SFC.

Expressed another way, the architecture may implement SFC with the hardware processing capability of a network switch. As one particular example, the architecture may implement SFC in a ToR switch. In some cases, the network switch is part of a data center, and may share SFC responsibilities with other network switches in the data center or elsewhere. That is, the SFC may be distributed among multiple network devices, each of which is responsible for a portion of the SC.

Figure 3:
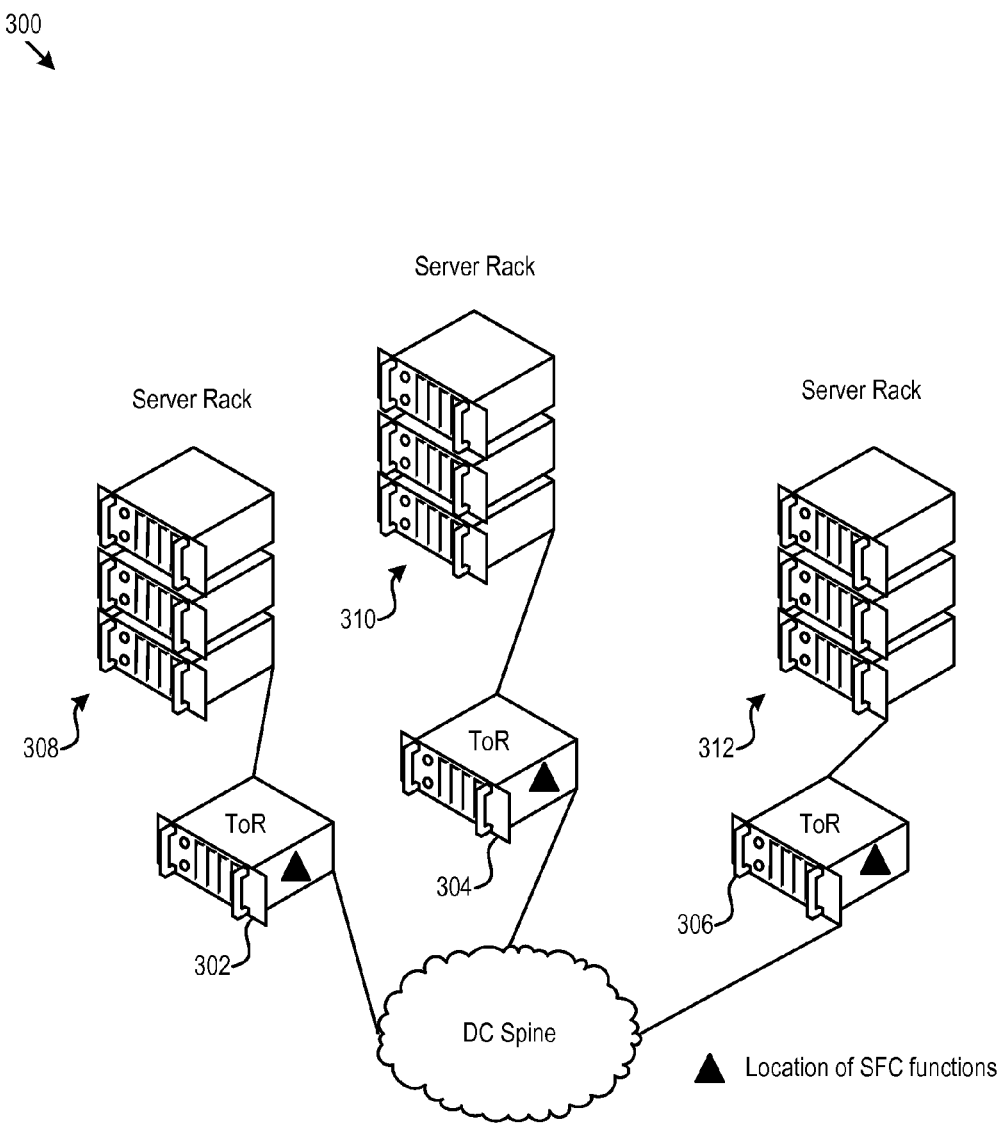
FIG. 3 shows an example network for service function chaining.

FIG. 3 shows an example network 300 for SFC. The SFC is network based, using SFC capable TOR switches 302, 304, and 306. The ToR switches may include scalable SFC processors that perform the SFC processing described further below. In one implementation, only the ToR switches maintain SF reachability tables and other state information for implementing SFC. That is, the servers 308, 310, and 312 need not maintain reachability tables or other state information in support of SFC.

Accordingly, one technical advantage is that there are fewer touch points for provisioning and SC definition and management. The architecture provides a better model for Service Level Agreement (SLA) enforcement, with an enhanced Operations and Management (OAM) model for end-to-end visibility. In addition, the architecture provides higher performance, allowing more effective and efficient use of device nodes. The architecture is also suitable for deployments of any size, from small to very large.

Figure 4:
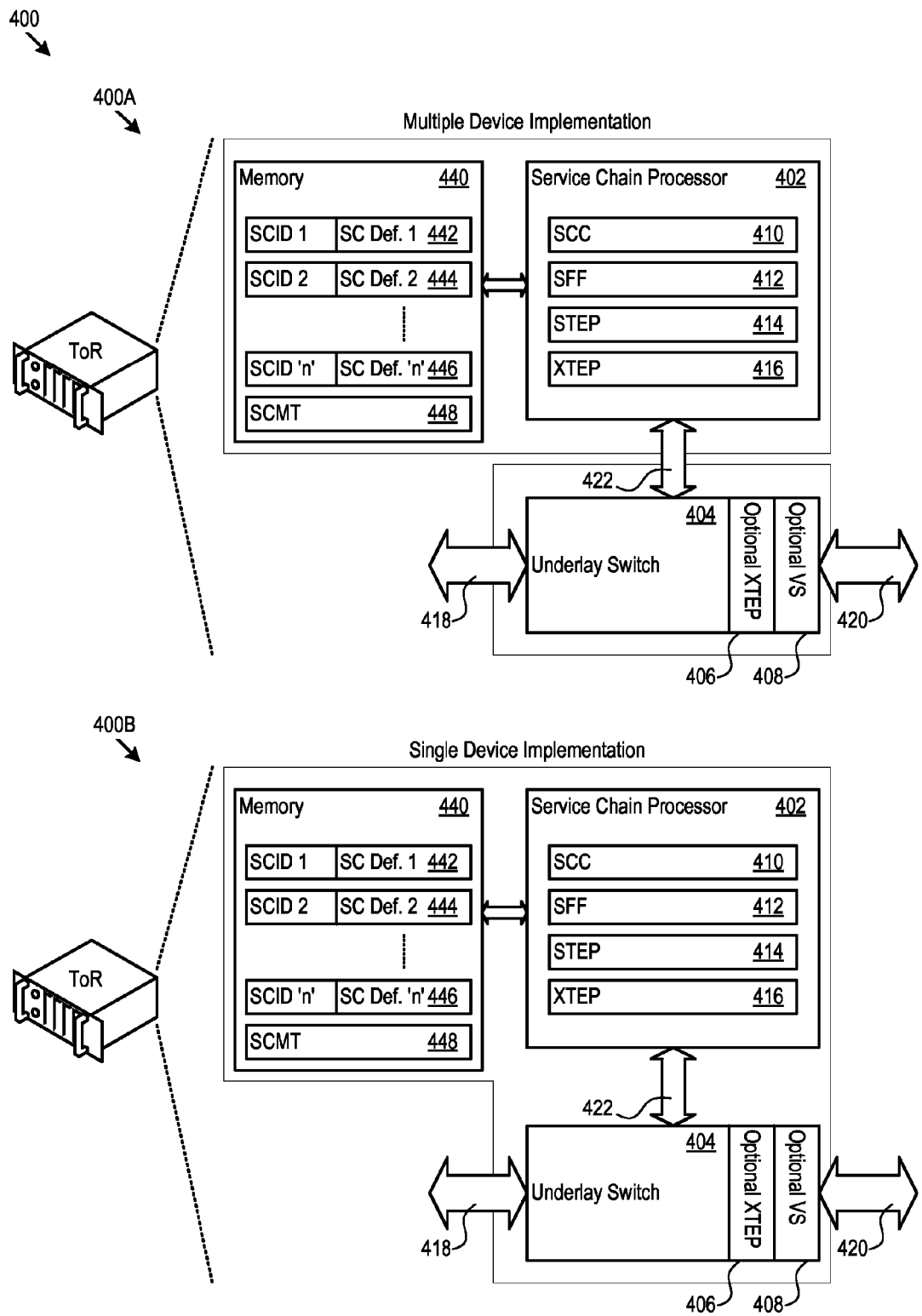
FIG. 4 shows an example of a top-of-rack switch.

FIG. 4 shows two example implementations of a network device, a top-of-rack switch 400. Each of the components of the switch 400 shown in FIG. 4 may be implemented logically, physically, or as a combination of both logical and physical elements. The switch 400A shows a multiple device implementation, while the switch 400B shows a single device implementation. The switch 400 includes a Service Chain Processor (SCP) 402 and an underlay switch 404. The underlay switch 404 may implement many different functions. As two examples, the underlay switch 404 may implement a data center tunnel end point (XTEP) 406, and may include a virtual switch (VS) 408. As one specific example, Trident series Ethernet switch ASICs may implement the underlay switch 404. As another example, a Caladan 3 network processing unit (NPU) may implement the SCP 402. When the SCP 402 and underlay switch 404 are integrated into a single device, Qumran and Jericho switch ASICs may implement the combined set of functionality. These NPUs and ASICs, as well as other implementation options, differ by scaling and performance capabilities and are available from Broadcom of Irvine, Calif.

As noted above, the functional blocks illustrated in FIG. 4 may be implemented as separate devices or may be present in different combinations in one more devices. In some implementations, for instance, the SCP 402 and underlay switch 404 are integrated into a single device, while in other implementations, they are implemented in separate devices. When integrated, the functional blocks may be distributed, as just one example, to form a flexible packet processing pipeline. An integrated implementation may be made in, e.g., Qumran or Jericho switching devices. Expressed another way, the SCP 402 may be added to a switch architecture in the form of a separate NPU (e.g., as shown by implementation 400A in FIG. 4), or the SCP 402, underlay switch 404, and any other functional blocks may be integrated in a single device, e.g., as part of a processing pipeline (e.g., as shown by implementation 400B in FIG. 4).

In this example the SCP 402 in the switch 400 implements a SCC 410. The SCC 410 may map incoming packet flows to a particular SC on any basis, e.g., by any combination of customer, source application, destination application, QoS, time/date, or other parameter. In some implementations, the SCC 410 performs the classification by mapping {Application ID, Subscriber ID/Class} from received packets to {Service Chain ID, Service Function Index}. The mapping may be performed by searching the service chain mapping table (SCMT) 448, which stores a classification mapping from packet classification to the network service chain definitions in the memory 440.

The SCC 410 may also add to each packet in the packet flow subject to the mapping a classification header that contains, e.g., {Service Chain ID, Service Function Index}. The service chain ID (SCID) identifies a particular SC definition in the memory 440, and the service function index (SFI) points to the next SF to execute on the received packets. The initial packets received in a packet flow may be tagged with a SFI that points to the first SF to execute in the SC to which the SCC 410 mapped the packet flow. The memory 440 may store any number of SC definitions. FIG. 4 labels three of the definitions as SC definition 1 442, SC definition 444, and SC definition 'n' 446, each with unique SCIDs.

In the example of FIG. 4, the SCP 402 also implements the SFF 412. The SFF 412 may forward packets from one SF to the next in a given SC, as described in more detail below. In one implementation the SFF 412 maps {Service Chain ID, Service Function Index} present in the packet classification header to {VS network address, SF network address}. The SFF also decrements the SFI and updates the SFC header on the packets that stores the SFI, in order to track and maintain progress of the packets through the SFs in the mapped SC.

The SCP 402 may further implement a service tunnel end point (STEP) 414. The STEP 414 may support service overlay networks for SF connectivity. The STEP 414 may also add, delete, and update service overlay tunnel headers on the packets that are subject to a SC. The service overlay tunnel headers connect, e.g., a first SCP to another SCP or to a VS.

The SCP 402 may also implement a data center tunnel end point (XTEP) 416. The XTEP 416 supports data center overlay network for VS connectivity. In particular, the XTEP 416 may add, delete, and update service overlay tunnel headers on the packets that are subject to a SC. The service overlay tunnel header may connect a SCP to a SF in a host that is, e.g., directly attached to the ToR switch currently processing the packets.

Note that the underlay switch 404 may implement Layer 2 and Layer 3 forwarding, using the outer headers of the packets. The packets may come from any combination of the SCP 402 and packet interfaces 418 and 420. The interface 418 may be an uplink interface, e.g., to other ToR switches in the same data center or elsewhere. The interface 420 may be a server node interface to, e.g., servers in the same rack as the switch 400. Any combination of physical and logical interfaces 422 connect the SCP 402 and the underlay switch 404.

Some of the technical advantages of the architecture 100 include that the server nodes do not need to incur the overhead of maintaining SFC forwarding state. In addition, the ToR switches that form the network architecture (which may include ToR switches in different server racks) may be either fully or partially meshed together using data center overlay tunnels, such as Virtual Extensible Local Area Network (VXLAN), Network Virtualization using Generic Routing Encapsulation (NVGRE), Generic Network Virtualization Encapsulation (Geneve), Shortest Path Breaching (SPB), as examples. The tunnel endpoint in each ToR may be a SCP. Further, in some implementations, tunnel provisioning is static. That is, tunnel provisioning may be configured once, and then selectively modified, such as when physical topology changes.

Further technical advantages include that each ToR in a rack may be logically connected to each server node in that rack using at least one data center overlay tunnel, such as VXLAN, NVGRE, Geneve, SPB tunnels. The tunnel endpoint in the ToR is a SCP, and in the server the endpoint may be a virtual switch (VS). If there are multiple VSs per server, then each VS may be connected to the SCP in the ToR with a separate data center overlay tunnel. Again, tunnel provisioning may be static in that tunnel provisioning may be configured once, and then selectively modified, for instance when physical topology changes.

Additional technical advantages include that each ToR in a rack may be logically connected to each VM that is a container for a SF in that rack using a service overlay tunnel. The service tunnel endpoint in the ToR is the SCP, and in the server node it is the VM. The service tunnel endpoint processing for each VM in the server node may be implemented in the virtual switch, in the VM guest operating system (OS), or in the network function itself.

Figure 5:
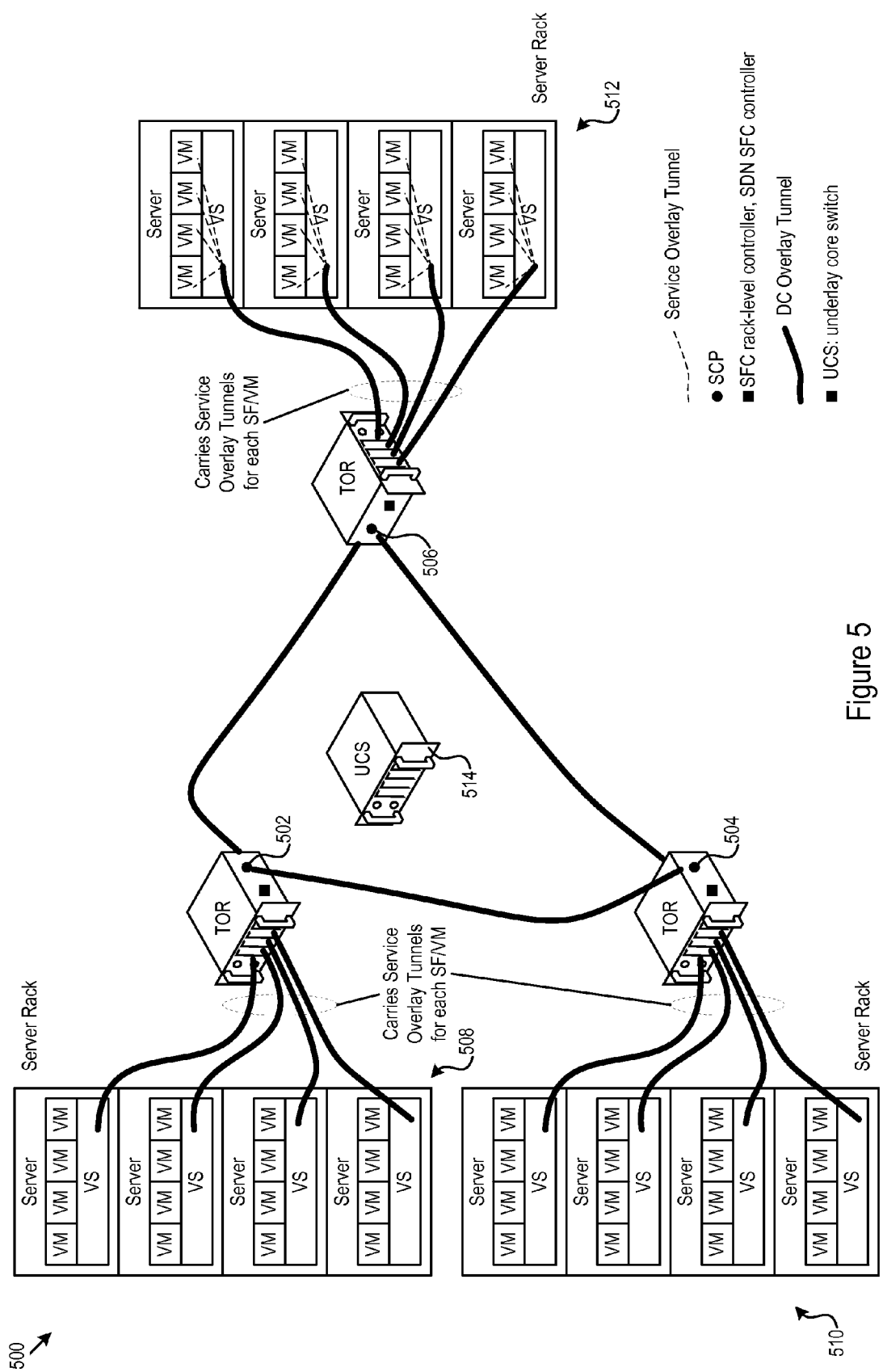
FIG. 5 shows an overlay tunnel topology for network based service function chaining.

FIG. 5 an example overlay tunnel topology 500 for network based SFC. Each ToR SCP 502, 504, and 506 may maintain reachability or forwarding state for SFs that are directly attached to it, e.g., within the local rack 508, 510, 512 respectively. If the next SF in the service chain is in another rack, the source ToR SCP forwards the packet to the target ToR SCP for that other rack, e.g., by sending the packets to that target ToR SCP in the other rack. The target ToR SCP then forwards the packet to the destination SF, e.g., by sending the packets to a VS in communication with VMs running in a host connected to that target ToR. The Underlay Core Switch (UCS) 514 represents the underlay switches in each ToR switch, and may connect the ToR SCPs 502, 504, and 506 through any sort of physical or logical network topology.

Figure 6:
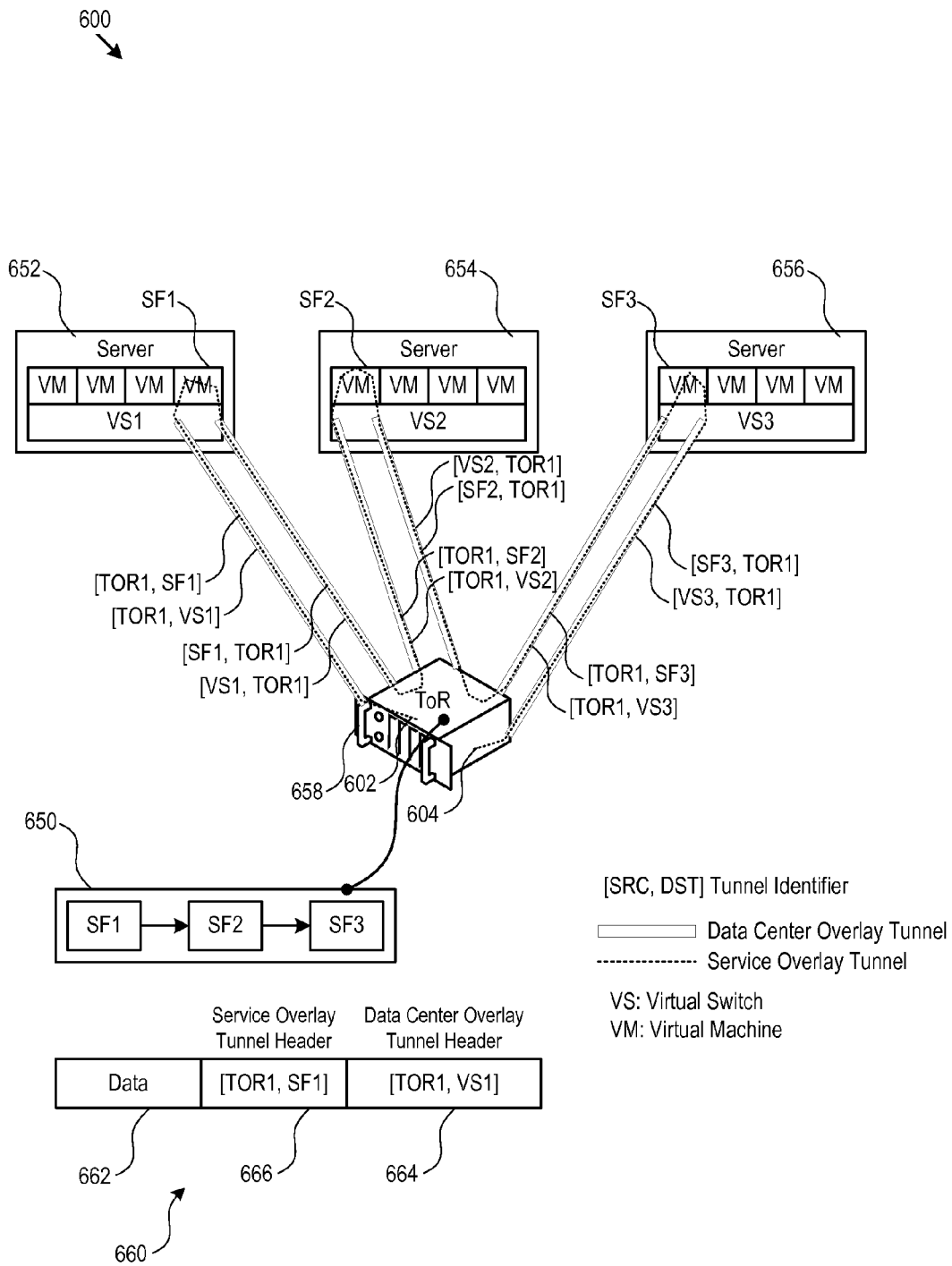
FIG. 6 shows forwarding in a service function chain within a rack.

FIG. 6 shows forwarding 600 in an example SC 650 within a rack of servers 652, 654, and 656 connected and served by a network switch 658. FIG. 6 shows the start 602 of the service chain 650, and the service overlay tunnel initiation point. FIG. 6 also shows the end 604 of the service chain 650, and the service overlay tunnel termination point. The service chain 650 starts and ends within the same server rack, with the VFs provisioned on servers 652, 654, and 656 connected to the network switch 658.

Note that in this example, neither the SFs nor the VSs maintain any SFC forwarding state information. The VSs returns packets associated with the SC, as determined by any identifying information, whether in the packet or according to VLAN, tunnel, or other network identifiers associated with the packet, to the local network switch 658. In one implementation, the VSs return packets by swapping the source (SRC) and destination (DST) in both data center and service overlay tunnel headers on the packets. The swap is performed to return the packets to the ToR for further processing, because no state is maintained in the VS. In that regard, the VSs may be pre-provisioned with flow tables that specify the addresses (e.g., the ToR switch addresses) for which the VS will perform the swapping.

FIG. 6 also shows an example packet 660. The packet includes a data payload 662 and SFC headers. For instance, the SFC headers may include a data center overlay tunnel header 664, which directs the packets to a particular VS that is in communication with the VM hosting the next SF. The SFC headers may also include a service overlay tunnel header 666 which specifies the network address of the SF connected to the VS. The SFF 412 may create, add, update, and remove the SFC headers as packets first arrive at the ToR switch, packets are sent to specific SFs in sequence and are received back from the SF after processing, and as packets complete their processing through the SC.

Figure 7:
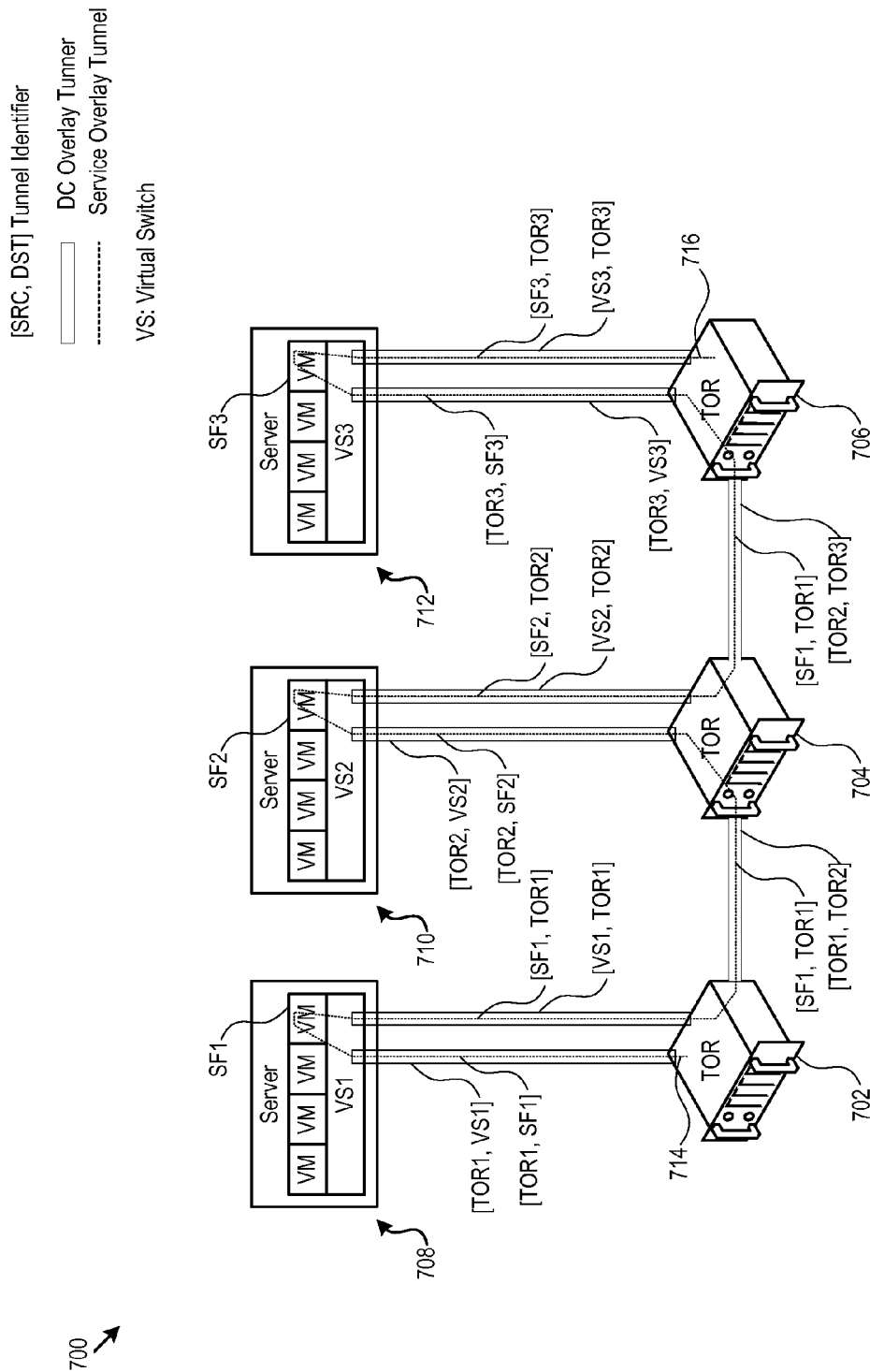
FIG. 7 shows forwarding in a service function chain extended through top-of-rack switches across racks.

FIG. 7 shows an example of network based SFC 700, with a SC extended through multiple network devices 702, 704, and 706 across racks 708, 710, and 712. FIG. 7 shows the service chain start 714 in the network device 702. The service chain start 714 may be the service overlay tunnel initiation point, e.g., where the network device 702 inserts the data center and service overlay tunnel headers onto the packets. FIG. 7 also shows the service chain end 716. The service chain end 716 may be the service overlay tunnel termination point, e.g., where the network device 706 removes the data center and service tunnel headers from the packets.

When packets subject to a SC are forwarded between two network devices, e.g., from network device 702 to network device 704, the transmitting network device 702 does not need to modify the service overlay tunnel identifier in the packet. Instead, the receiving network device may update the service overlay tunnel header before sending the packet to its local SF.

Note again that in this example, the SFs and VSs do not maintain any SFC forwarding state information. The VSs return packets associated with the SC, as determined by any identifying information, whether in the packet or according to VLAN, tunnel, or other network identifiers associated with the packet, to its local network device. The VSs may return packets by, e.g., swapping the SRC and DST in both the data center and service overlay tunnel headers.

FIG. 7 shows ToR switch to ToR switch traffic for handling SCs distributed across ToR switches. The SCP function in each ToR switch updates the data center and service overlay tunnel headers to direct the packets to the next hop along the SC. The SCP function in each ToR switch only needs to process the portion of the SC that includes the VSs, VMs, and SF directly connected to that ToR switch. The SCP function in each ToR switch may perform a lookup on the service chain header (which may include, e.g., the service function index and the service chain identifier) to determine whether that ToR switch is responsible for any part of the SC. That is, each ToR switch may perform a service function forwarding lookup, e.g., against {SCID, SFI} and responsively update both the data center and service overlay tunnel headers. The service overlay tunnel header on packets traveling between ToR switches may simply be placeholder data, and will be replaced with network address data for the SF by the next ToR switch that handles the next part of the SC.

Figure 8:
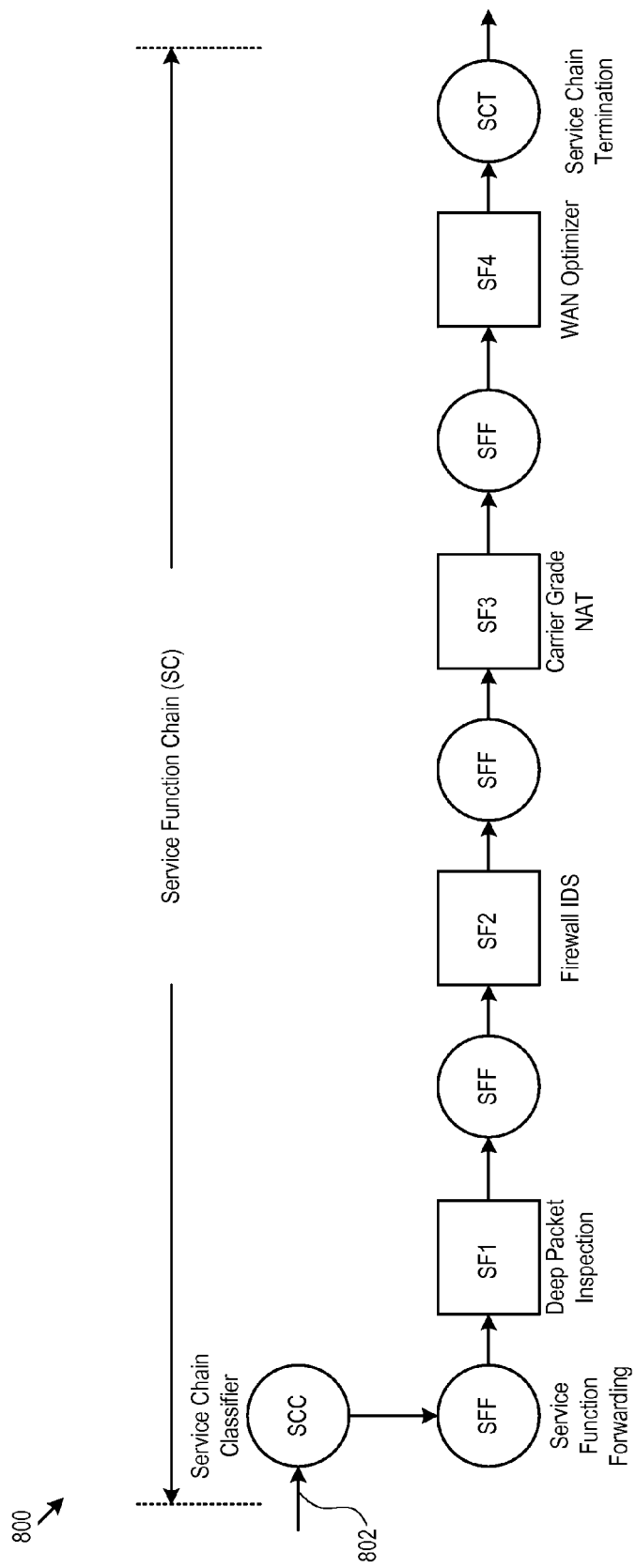
FIG. 8 shows an example service function chain.

FIG. 8 shows an example service function chain (SC) 800. A SC may be implemented as a predefined sequence of SFs. The sequence of SFs may deliver a predetermined data plane service for packet flows through the network device(s) implementing the SC. As noted above, individual network devices may define, store, and manage SCs. Each SC may have a SCID as a unique ID within the network, and which designates the SC as a particular chain of SFs. The network devices may maintain a service function index (SFI) as an index to a SF within the specified SC.

A SCC maps packet flows to a SCID by tagging the packets with header information, by mapping, e.g., {Application ID, Subscriber ID/Class} from received packets to {Service Chain ID, Service Function Index}. The SCC may be implemented anywhere in the network. On ingress, the SCC performs an identification and classification of traffic as mapping to a certain SC (or to no SC). The SCC may perform the analysis at a macro level, e.g., based on all traffic from another network according to IP address of the network, based on a segment of the network (e.g., by port or subnet), based on user or owner of the traffic, or based on the application generating the packets (as just a few examples, a Voice-over-IP application, a file transfer application, a virtual private network (VPN) application, an application generating encrypted content, or a video or audio streaming application). In performing the mapping, the SCC may perform deep packet inspection (DPI) to determine a specific SC that the packets should be processed through.

The SFF forwards packets from one SF to the next within a SC. The SFF may forward packets by mapping {SCID, SFI} to physical network address, e.g., {VS network address, SF network address}. The SF at the physical network address performs the next service function specified in the SC. At the completion of the SC, a service chain termination (SCT) function removes the service chain tags/headers from the packets, and the packets return to non-SC routing through the network switches.

In the example of FIG. 8, the SCC has determined that in incoming packet flow 802 should be subject to the SC 800. The packet flow 802 progresses through the SC, which defines four SFs in sequence: SF1, a deep packet inspection; SF2, a firewall; SF3, a network address translation; and SF4, a wide area network optimizer. Before each SF, the SFF determines the next SF for the packet, by maintaining the SFI (e.g., by incrementing or decrementing the SFI) to track which SF in the SC should next process the packets.

Figure 9:
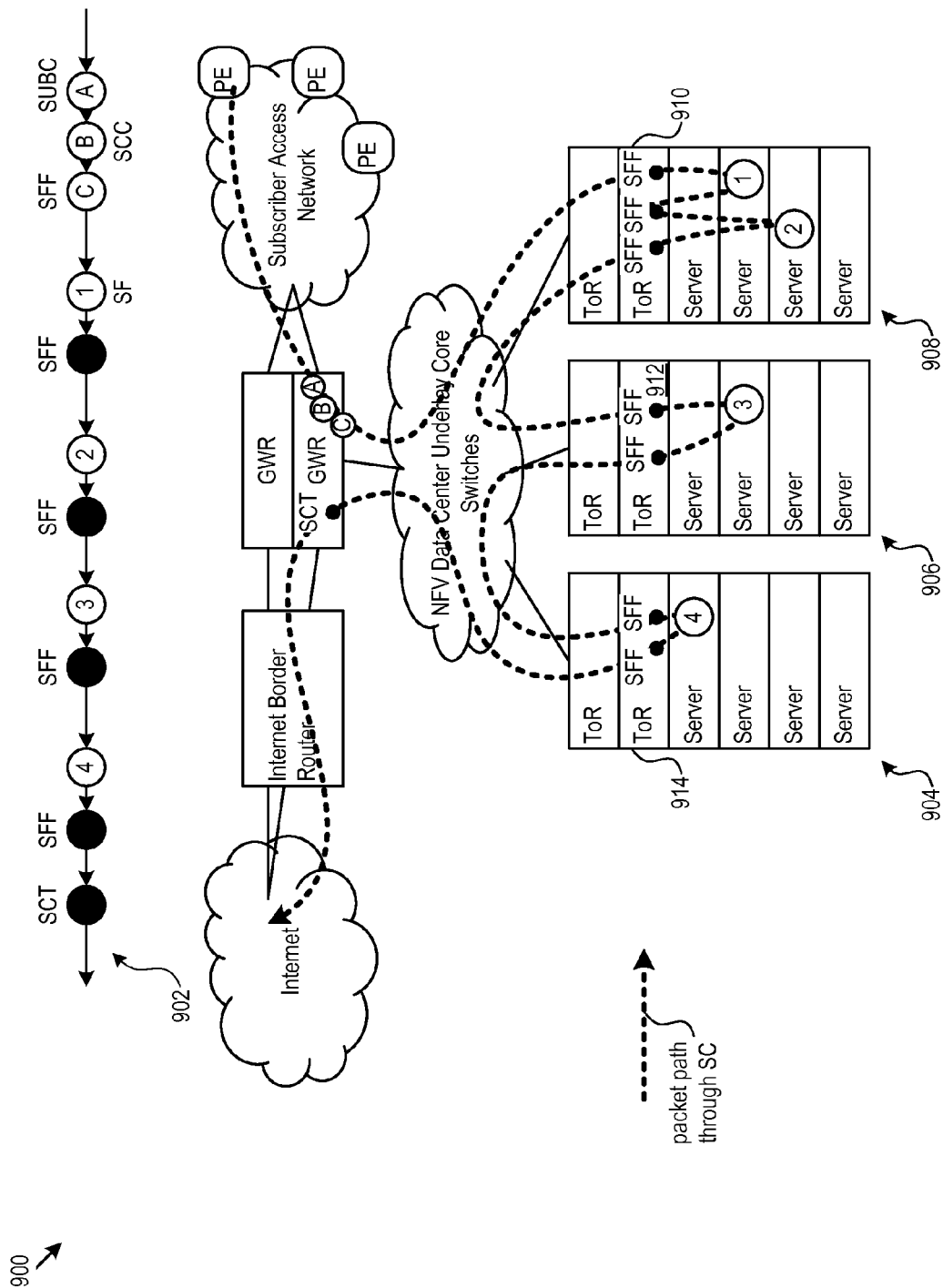
FIG. 9 shows another example of forwarding in a service function chain extended through top-of-rack switches across racks.

FIG. 9 shows another example of forwarding 900 through a SC 902 that extends through ToR switches across racks 904, 906, and 908. The SC 902 includes four SFs in sequence: SF1, SF2, SF3, then SF4. Prior to entering the SC, a subscriber classifier (SUBC) (function node A) identifies packet flows associated with a subscriber and maps the flows to a particular flow identifier. The SCC (function node B) maps the flow identifier (and optionally additional characteristics such as packet source) to a SC, and tags the packets with a SFC classification header that contains the SCID.

Expressed another way, when packets arrive, a gateway node (e.g., a gateway router GWR) may inspect and classify the packets. In some implementations, there are two types of classification: application classification and flow origination classification. For application classification, the network node performing the classification examines the packets and determines their contents, e.g., video, HTTP data, or file transfer data, and generates a corresponding application identifier. For flow origination classification, the network node performing the classification may identify a source of the packets. As an example, the source IP address may identify the source. The combination of application and source data may be used as a lookup to find a policy provisioned in the network node performing classification. The policy may map application and source IDs (or other traffic characteristics) to a SCID. The network node may implement service header encapsulation which provides the SCID and SFI in, e.g., a classification header added to the packet. The SFF in the ToR switch responds to the classification header to route the packets through the SC to SFs by mapping SCID and SFI to physical network addresses.

In the example of FIG. 9, the first two SFs are provisioned in hosts in the server rack 908. Accordingly the ToR switch 910 executes the SFF function three times, as shown in FIG. 9, to route the packets through two SFs, and then onto the next rack 906, where the next SF in the SC is provisioned. In the ToR switch 912, the ToR switch 912 executes SFF functions twice, one to direct the packets to SF3, and once to direct the packets to the ToR switch 914, where the final SF, SF4 is hosted in the server rack 904. The ToR switch 914 executes SFF functionality to direct the packets to SF4, and again to direct the packets back to the network, where the SCT removes the packet headers used for SFC, and returns the packets to the network for general purpose routing. Note that in FIG. 9, the gateway routers (GWR) perform some of the SC processing, including SUBC, SCC, an instance of SFF, and SCT.

Figure 10:
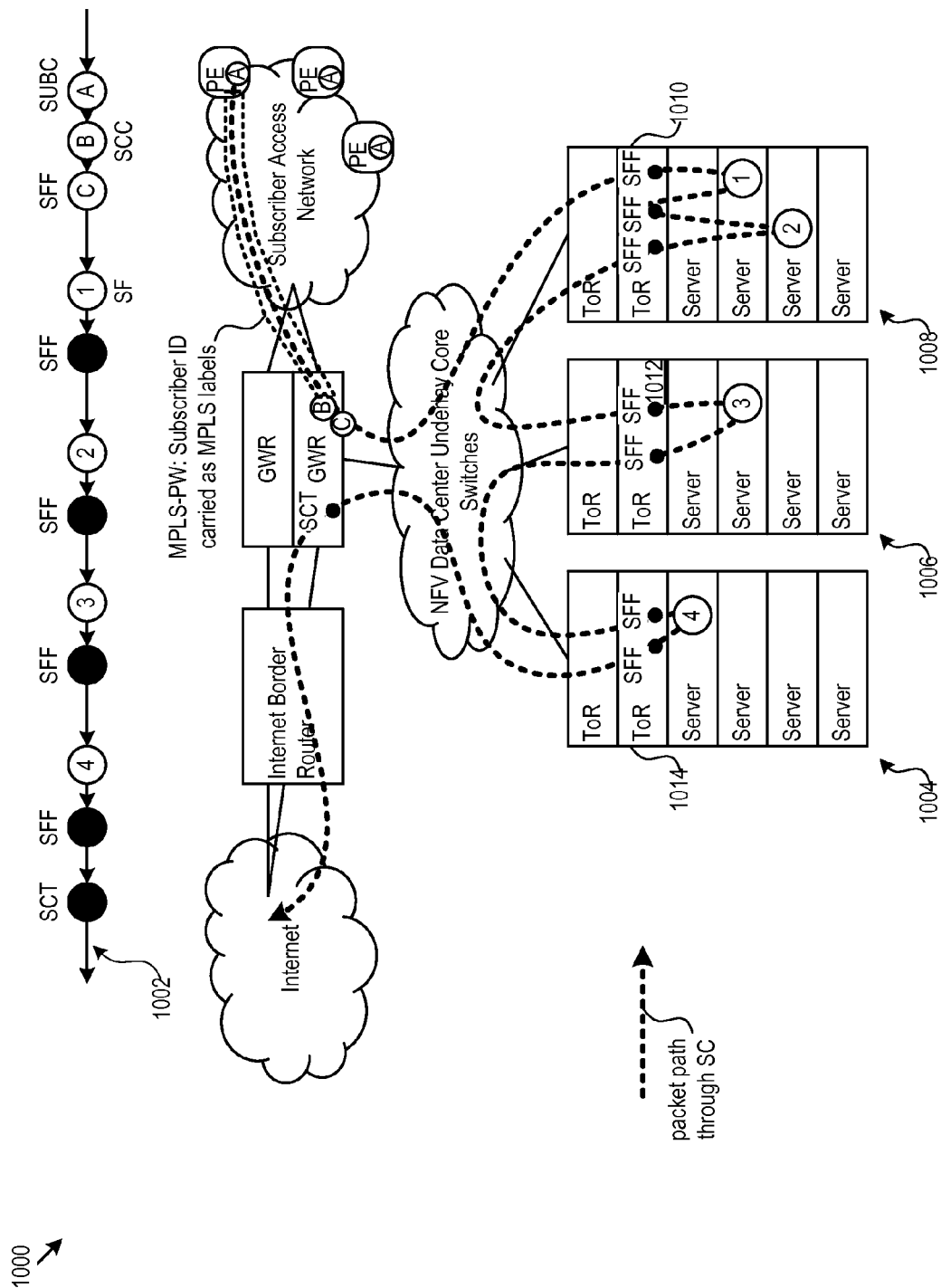
FIG. 10 shows another example of forwarding in a service function chain extended through top-of-rack switches across racks.

FIG. 10 extends the example of FIG. 9, and shows another example of forwarding 1000 through a SC 1002 that extends through ToR switches 1010, 1012, and 1014 across racks 1004, 1006, and 1008. Note that in FIG. 10, devices (e.g., physical endpoints (PEs)) in the subscriber access network perform the SUBC function. In this example, the PEs may communicate the resulting subscriber identifiers in MPLS labels to the following SCC function in the GWR. The SCC maps the subscriber identifier to an SC, and the packets are processed through the SC as noted above with regard to FIG. 9.

Figure 11:
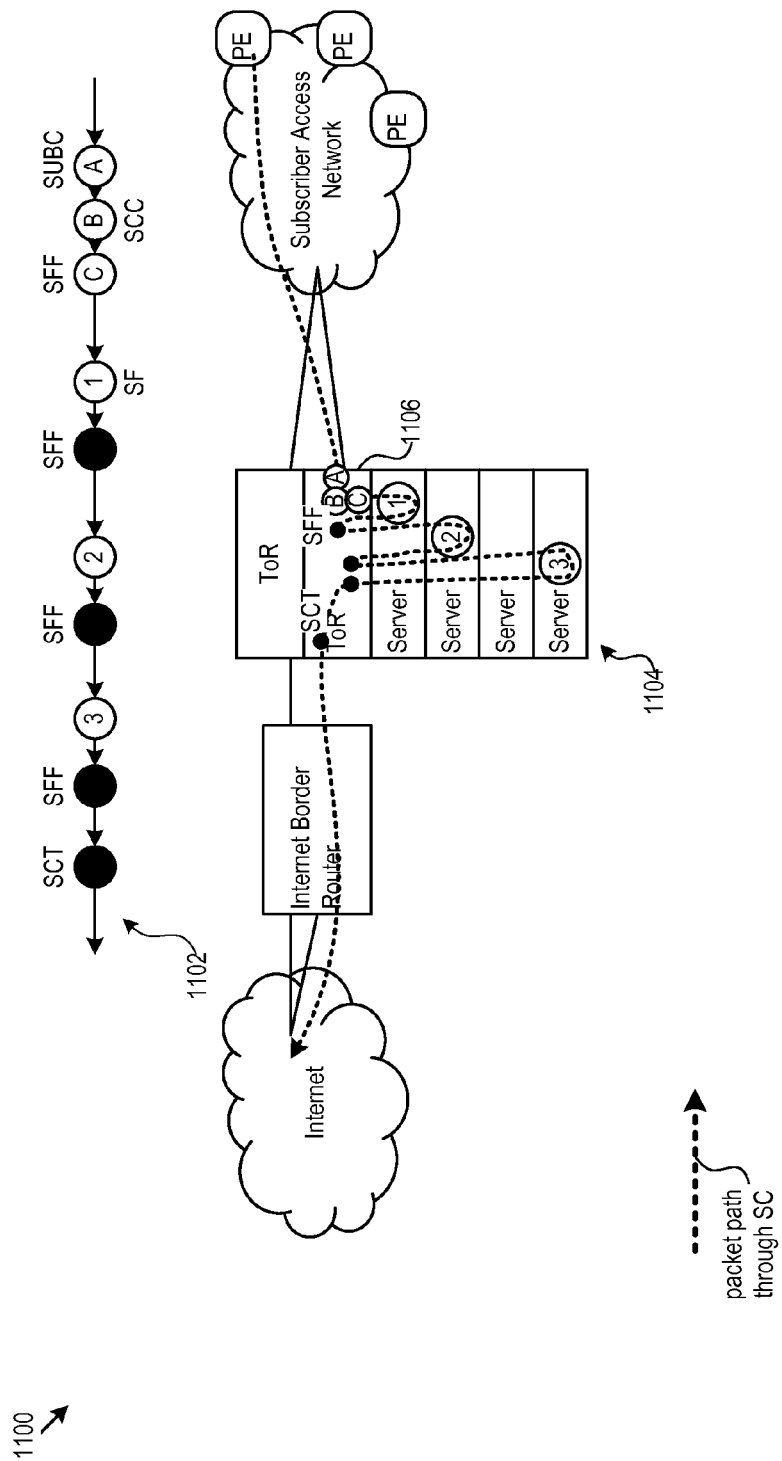
FIG. 11 shows another example of forwarding in a service function chain within a rack.

FIG. 11 shows another example of forwarding 1100 in a service function chain 1102 within a rack 1104. In this example, the ToR switch 1106 performs the functions of the SUBC, SCC, SFF and SCT. As the Tor switch 1106 forwards packets to the next SF in the SC, it tracks the SFI to determine where next to forward packets returning to the ToR switch 1106 from the hosts that execute the SFs. As the index tracks through the SC, to the end of the SC, the ToR switch 1106 recognizes that the packets have completed the SC, and executes the SCT function to remove the service and data center overlay tunnel headers applied to the packets to assist with network based SFC.

In the network based SFC architectures described above, the forwarding state for SFC, and specifically the function that maps the logical address of a SF to a physical network address, is maintained in the network device itself, e.g., the ToR switch. The forwarding state and the mapping function need not be provided or maintained in the VSs. One beneficial result is that the service chain controller only needs to manage the mapping table in the network device, and not in all of the endpoints. In common scenarios where there are many servers per ToR switch (e.g., 48 to 1) in a rack, there is a significant reduction in management overhead.

The VS participation in network based SFC is to receive packets and pass them to the SF provisioned in a VM. The VS returns the packets, after processing by the SF, to the originating network device, e.g., the originating ToR switch. The VS need not store any information about the next hop SF in the SC, but instead returns the packets after processing to the network device for the next hop determination.

As another use case example, assume a SC that includes three SFs in sequence: DPI, followed by a firewall, followed by virtual router. The ToR switch has assigned the SC a SCID as part of provisioning the SC. A particular service function is addressed using tuple logical addressing, which in one implementation is the SCID and SFI. That is, each SF has an index within the SC. In this example, the index may start with index value 3, for the DPI SF, then index value 2, for the firewall SF, then index value 1, for the router SF.

The SCP 402, and in particular the SFF 412 implemented by the SCP 402, maps the logical addresses, e.g., {SCID 50, SFI 3}, to a physical network address. In one implementation, the physical network address includes two components: an overlay endpoint, which is the address of the VS that attaches the SF, and the address of the SF within the VS. After packets arrive, the SFF 412 performs the lookup to map the SCID and SFI to the next SF. The SFF 412 creates and adds (or updates) the data center overlay tunnel header for the packets, which direct the packets to the particular VS that is in communication with the VM hosting the next SF. The SFF 412 also creates and adds (or updates) the service overlay tunnel header on the packets which specifies the address of the SF connected to the VS. That is, as a result of lookups by the SFF 412, the SFF 412 may create, add, modify, or delete the service tunnel header and data center overlay tunnel.

The SFC tracks progress of the packets through their mapped SCs, e.g., by decrementing the SFI for the packets. For instance, after return from the DIP SF, the SFC may decrement the SFI from 3 to 2, and update the header of packet which carries the SCID and SFI. The next lookup in this example is done against {SCID 50, SFI 2} to find the network address of the subsequent SF (the firewall SF), which is the next SF to process the packets in the SC. The SFC proceeds in this manner until the SFI becomes zero. At that point, the SFC recognizes that the packet has reached the end of the SC, removes the SFC headers, and forwards the packet in the manner it normally would without SFC processing.

The SFC processing described above may be implemented in many different ways by many different types of circuitry, from highly specialized packet processors to general purpose central processing units. In one implementation, the SFC processing is implemented by the data plane of the network switch. The data plane may include specialized network processors attached to multigigabit switch fabric.

Referring again to FIG. 5, the network based SFC processing is supported by an overlay topology. The overlay topology implements packet tunneling connections that interconnect the SCPs in each network device (e.g., ToR switch) and each VS in a server rack. The SCPs 412 may be the tunnel endpoints. The overlay topology implements a hub and spoke connection architecture. In the topology, each network device is meshed together with overlay tunnels, e.g., tunnels from each ToR switch to each other ToR switch across a defined location such as a particular data center.

Accordingly, each network device has a data center tunnel connection to each directly attached host (and VS) for a SF. A service tunnel is defined within the data center tunnel to connect the SCPs to the individual SFs and the VMs that host the SFs. The data center tunnels support communication between ToR switches, each of which may handle packet routing for any part of a SC that may cross any number of ToR switches and server racks, e.g., along a data center spine that connects multiple server racks in a data center.

The data center overlay tunnel and the service overlay tunnel form a two layer forwarding architecture that connects any network device, e.g., any network switch, to any SF, whether physical or virtual. In one implementation, the outer layer addresses a particular VS, and the inner layer addresses a particular SF hosted by a node in communication with the VS. Addressing is not limited to IP or MAC addresses, but instead any type of addressing may be used. The overlay topology provides logical and physical connections from each ToR switch in a server rack to each VS, VM, and SF.

Figure 12:
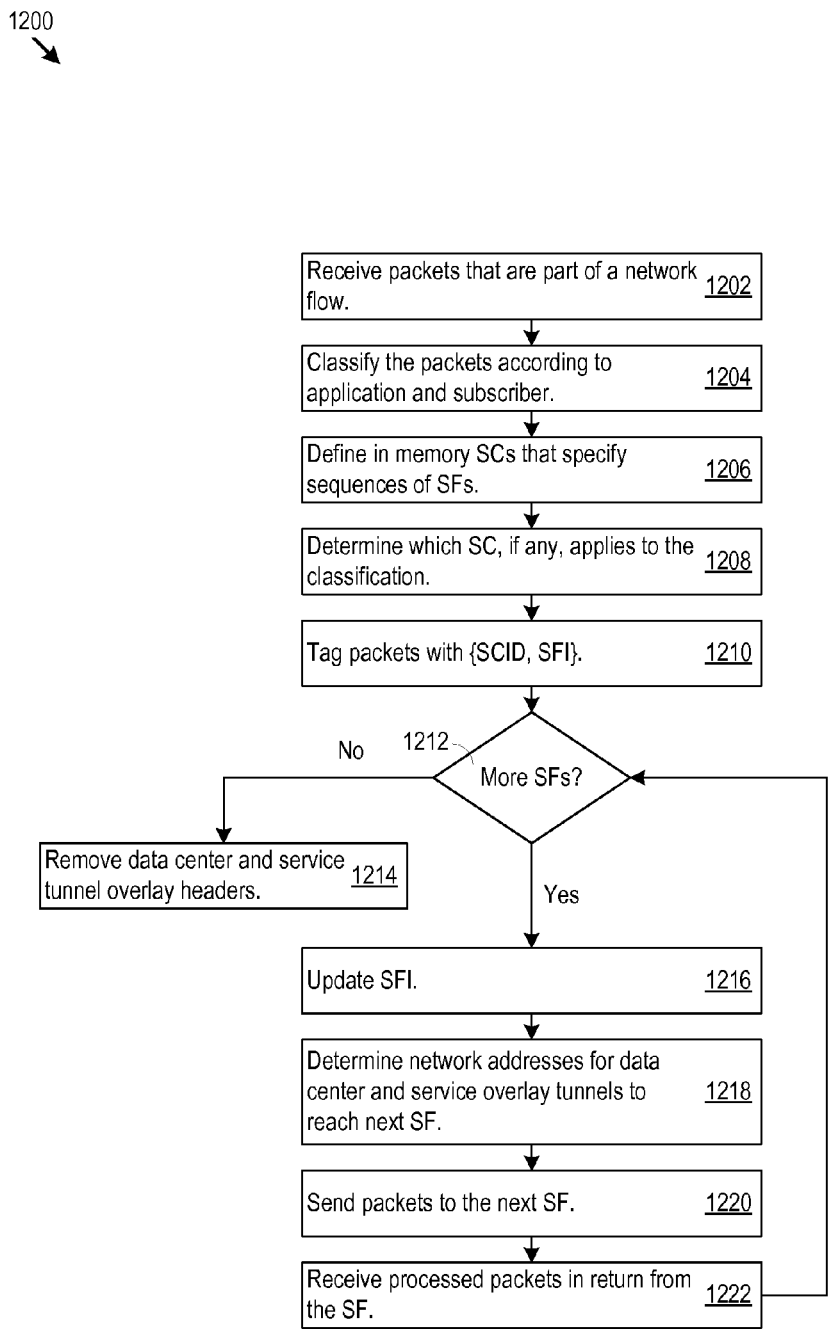
FIG. 12 shows an example of logic that may be implemented by a network node to perform network based service function chaining.

FIG. 12 shows logic 1200 that a network node may implement to execute network node based SFC. The logic 1200 receives packets that are part of a network flow (1202). Any logical or physical network node (e.g., the SCC 410 in the SCP 402) may classify the packets according to, e.g., application/content and source/subscriber (1204). The logic 1200 includes defining SCs in memory (1206). The SCs may specify sequences of SFs, e.g., by using index values, that order different service functions in a particular sequence. The classification information may be provided a function such as the SFF 412 that determines which SC, if any, applies to the classification (1208). The function may tag the packets with the applicable {SCID, SFI} in a packet header (1210).

The SFF 412 checks the SFIs to determine whether there are more SFs to process the packets in the SC (1212). If there are not, then the SFF 412 removes the data center and service overlay tunnel headers from the packets (1214). The packets are then processed normally by the network device. If there are additional SFs to process the packet, then the SFF 412 updates the SFI (1216), and determines network addresses (e.g., based on {SCID, SFI}) to reach the next SF. The SFF 412 creates or modifies, as needed, the data center and service overlay tunnel headers on the packets to direct the packets to the next SF (1218).

The SFF 412 may then direct the packets to the next SF (1220). For instance, the SFF 412 may send the packets through the underlay switch, through the overlay topology to a VS and VM that are in communication with the next SF.

The VS returns the packets, processed by the SF, to the SFF 412, e.g., by swapping SRC and DST information in the data center and service overlay tunnel headers. The SFF 412 receives the processed packets returned from the SF and VS (1222) and checks whether any subsequent SFs should process the packets (1212).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A network switch comprising:
a network flow interface configured to receive a network flow comprising a packet;
a memory configured to store a network service chain definition, the network service chain definition comprising a service function specifier of a service function provisioned on a server resource separate from the network switch; and
service chain processing circuitry in communication with the network flow interface and the memory, the service chain processing circuitry configured to:
determine that the network service chain definition applies to the network flow;
determine that the packet should next be processed by the service function;
update a service function index to track progress of the packet through the network service chain definition;
tag the packet with a network address for the service function in a service function chain header that follows a network tunnel header; and
forward the packet out of the network switch to the service function on the server resource,
wherein the service chain processing circuitry is further configured to swap source and destination addresses in the service function chain header and the network tunnel header when the packet is to be returned to a source thereof.

2. The network switch of claim 1, wherein the service chain processing circuitry is further configured to:
obtain a flow classification for the packet; and
map the flow classification to the network service chain definition, to determine that the network service chain definition applies to the network flow.

3. The network switch of claim 2, wherein the flow classification comprises an application identifier, a subscriber identifier, or both.

4. The network switch of claim 1, wherein
the network service chain definition specifies a sequential order for execution of the service function within the network service chain definition; and
the service chain processing circuitry is further configured to:
read a header of the packet to determine a current index value; and
match the current index value to the network service chain definition to determine that the packet should next be processed by the service function.

5. The network switch of claim 4, wherein the service chain processing circuitry is further configured to update a service function index to account for forwarding the packet to the service function for processing.

6. The network switch of claim 5, wherein:
the service chain processing circuitry is further configured to receive, from the server resource, the packet after processing by the service function; and
determine a subsequent destination within the network service chain definition based on the service function index.

7. The network switch of claim 6, wherein the service chain processing circuitry is further configured to:
again update the service function index for the packet, to track progress of the packet through the network service chain definition; and
forward the packet out of the network switch to the subsequent destination.

8. The network switch of claim 7, wherein the subsequent destination is a different service function provisioned on a different server resource.

9. The network switch of claim 8, wherein the different server resource is connected to a separate network switch.

10. A method comprising:
in a network switch that interconnects host servers on which are provisioned a first service function and a second service function:
defining, in memory, a network service chain definition specifying a sequence of service functions, including:
the first service function; and
the second service function;
wherein the network service chain definition includes:
a first service function index for the first service function; and
a second service function index for second service function;
wherein the first and second service function indices order the first service function before the second service function;
receiving a packet that is part of a network flow;
determining classification information for the packet based on a service function chain header of the packet that follows a network tunnel header of the packet;
determining that the network service chain applies to the network flow based on the classification information;
determining that the first service function should next process the packet; and
forwarding the packet to the first service function,
wherein source and destination addresses in the service function chain header and the network tunnel header are swapped when the packet is to be returned to a source thereof.

11. The method of claim 10, further comprising:
determining a service chain identifier and a service function index for the packet after it is received and it is determined that the network service chain applies to the network flow.

12. The method of claim 11, wherein:
the service chain identifier identifies the network service chain definition; and
the service function index identifies the first service function.

13. The method of claim 11, wherein the service function chain header includes the service function index and the service chain identifier.

14. The method of claim 11, further comprising:
adjusting the service function index to point to the second service function prior to forwarding the packet to the first service function.

15. The method of claim 11, further comprising:
mapping the service chain identifier and service function index to a network address for the first service function.

16. The method of claim 15, wherein the network address comprises a virtual switch address, a service function network address, or both.

17. The method of claim 15, further comprising:
prior to forwarding, adding the network tunnel header to the packet, the network tunnel header comprising:
a virtual switch address of a virtual switch serving a host server for the first service function,
wherein the service function chain header that follows the network tunnel header includes a service function network address for the first service function on the host server.

18. A network switch comprising:
a packet interface configured to receive packets into the network switch, and communicate packets out of the network switch;
a memory configured to store:
network service chain definitions, including:
a first network service chain definition specifying a first sequence of service functions that constitute a first packet processing chain; and
a first service chain identifier for the first network service chain definition; and
a service chain mapping table comprising:
a classification mapping from packet classification to the network service chain definitions in the memory;
a service chain processor in communication with the packet interface, the service chain processor configured to:
obtain classification information for the packets;
determine from the classification information and the service chain mapping table that the first network service chain should process the packets;
among the first sequence of service functions, determine a next service function to execute on the packets;
track progress of the packets through the first network service chain by updating a service function header of the packets;
add a network tunnel header to the packets, the network tunnel header comprising a virtual switch address of a virtual switch in communication with a host server for the next service function; and
add the service function chain header following the network tunnel header, the service function chain header comprising a service function network address for the next service function on the host server; and
forward the packets out of the network switch to the next service function on the host server,
wherein the service chain processing circuitry is further configured to swap source and destination addresses in the service function chain header and the network tunnel header when the packet is to be returned to a source thereof.

19. The network switch of claim 18, wherein
the service function header further comprises:
the first service chain identifier; and
a service function index into the first network service chain.

20. The network switch of claim 19, wherein
the network switch is configured to:
receive the packets back at the network switch after processing by the next service function; and
the service chain processor is configured to:
track progress by changing the service function index into the first network service chain to point to a subsequent service function that follows the next service function for the packets; and
forward the packets received after processing by the next service function to the subsequent service function in the first network service chain.

* * * * *